US011249413B2

United States Patent
Yoshida et al.

(10) Patent No.: US 11,249,413 B2
(45) Date of Patent: Feb. 15, 2022

(54) OPTICAL SCANNING DEVICE AND IMAGE FORMING APPARATUS INCLUDING THE SAME

(71) Applicant: KYOCERA Document Solutions Inc., Osaka (JP)

(72) Inventors: Shingo Yoshida, Osaka (JP); Tatsuya Kobayashi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/922,742

(22) Filed: Jul. 7, 2020

(65) Prior Publication Data
US 2021/0011393 A1    Jan. 14, 2021

(30) Foreign Application Priority Data

Jul. 10, 2019  (JP) .............................. JP2019-128618
Jul. 10, 2019  (JP) .............................. JP2019-128622

(51) Int. Cl.
*G03G 15/04*      (2006.01)
*G02B 27/00*      (2006.01)
(Continued)

(52) U.S. Cl.
CPC ..... *G03G 15/04036* (2013.01); *F16M 11/046* (2013.01); *G02B 27/0006* (2013.01);
(Continued)

(58) Field of Classification Search
CPC ......... G03G 15/04036; G02B 27/0006; F16M 11/046; G03B 21/56; G03B 21/60; G03B 21/58; G03B 21/62
(Continued)

(56) References Cited

U.S. PATENT DOCUMENTS

| 10,895,817 | B2* | 1/2021 | Imai ................. G03G 15/04036 |
| 2016/0033890 | A1* | 2/2016 | Sumikura .............. G03G 15/04 347/118 |

(Continued)

FOREIGN PATENT DOCUMENTS

| JP | 2009-143108 | A | 7/2009 | |
| JP | 2009143108 | * | 7/2009 | ............... B41J 3/00 |
| JP | 2016-31467 | A | 3/2016 | |
| JP | 2016031467 | * | 3/2016 | ............... B41J 2/47 |

*Primary Examiner* — Clayton E. LaBalle
*Assistant Examiner* — Kevin C Butler
(74) *Attorney, Agent, or Firm* — Stein IP, LLC

(57) ABSTRACT

An optical scanning device includes a housing, a transmissive member, a wire-shaped member, a driving portion, a cleaning holder, a cleaning member, a stopper, and a control portion. The control portion is capable of executing a cleaning mode including at least one of a forward travel operation of controlling the wire-shaped member to travel in a first direction so that the cleaning holder moves along the transmissive member and a backward travel operation of, after executing the forward travel operation, controlling the wire-shaped member to travel in a second direction so that the cleaning holder moves in an opposite direction to a direction of the forward travel operation. The control portion executes a load releasing operation of controlling the cleaning holder to move by a prescribed amount in an opposite direction to the direction of the forward travel operation or the direction of the backward travel operation.

13 Claims, 10 Drawing Sheets

(51) Int. Cl.
*G03B 21/62* (2014.01)
*G03B 21/60* (2014.01)
*G03B 21/58* (2014.01)
*F16M 11/04* (2006.01)
*G03B 21/625* (2014.01)
*G03B 21/56* (2006.01)

(52) U.S. Cl.
CPC ............ *G03B 21/56* (2013.01); *G03B 21/58* (2013.01); *G03B 21/60* (2013.01); *G03B 21/62* (2013.01); *G03B 21/625* (2013.01)

(58) Field of Classification Search
USPC ......................................................... 359/443
See application file for complete search history.

(56) References Cited

U.S. PATENT DOCUMENTS

| | | | |
|---|---|---|---|
| 2016/0033923 A1* | 2/2016 | Sumikura | G03G 15/04 399/98 |
| 2017/0329275 A1* | 11/2017 | Uchida | B41J 29/17 |
| 2020/0033749 A1* | 1/2020 | Kamata | G03G 15/04072 |
| 2020/0050138 A1* | 2/2020 | Suzuki | G03G 21/0005 |
| 2020/0050139 A1* | 2/2020 | Takezawa | G03G 21/00 |
| 2020/0081385 A1* | 3/2020 | Kamei | G03G 21/0005 |
| 2020/0096931 A1* | 3/2020 | Seki | G03G 15/5045 |
| 2020/0150571 A1* | 5/2020 | Seki | G03G 21/1666 |
| 2020/0257233 A1* | 8/2020 | Baba | G03G 21/1666 |
| 2020/0278638 A1* | 9/2020 | Takezawa | G03G 15/5054 |
| 2020/0379398 A1* | 12/2020 | Baba | G03G 15/04 |

\* cited by examiner

OPTICAL SCANNING DEVICE AND IMAGE FORMING APPARATUS INCLUDING THE SAME

INCORPORATION BY REFERENCE

This application Is based upon and claims the benefit of priority from the corresponding Japanese Patent Application No. 2019-128618 (filed on Jul. 10, 2019) and Japanese Patent Application No. 2019-128622 (filed on Jul. 10, 2019), the contents of which are incorporated herein by reference.

BACKGROUND

The present disclosure relates to an optical scanning device that irradiates an image carrier with light so as to form an electrostatic latent image in an electrophotographic image forming apparatus and to the image forming apparatus including the optical scanning device.

An image forming apparatus adopting an electrophotographic method, such as a copy machine or a printer, is provided with an optical scanning device. The optical scanning device irradiates a charged image carrier with light so as to form an electrostatic latent image on the image carrier. A housing of the optical scanning device includes a housing portion having an opening in one surface thereof and a cover portion covering the opening. A scanning optical system is incorporated inside the housing portion, and in the cover portion, an emission port for light emitted from the scanning optical system is formed so as to correspond to the image carrier. Moreover, the emission port is covered with a transmissive member. The transmissive member is a member having a transmission property with respect to light emitted from the scanning optical system.

The transmissive member is provided so as to prevent entry of toner, dust, or the like into the optical scanning device. Toner, dust, or the like adhering to some or all of a plurality of optical components disposed inside the optical scanning device may cause deterioration in optical characteristics. Such deterioration in optical characteristics leads to deterioration in quality of an image formed on a recording medium such as a sheet.

Meanwhile, toner, dust, or the like adhering to an outer surface of each of some or all of such transmissive members may also cause deterioration in optical characteristics. For this reason, the outer surface of each of the transmissive members needs to be cleaned periodically, and there is known, for example, an automatic cleaning mechanism that automatically cleans an outer surface of each transmissive member. In the automatic cleaning mechanism, a plurality of cleaning holders are caused to move at one time in the same direction by screw shafts disposed along longitudinal directions of a plurality of transmissive members, respectively. Each of the cleaning holders holds one cleaning member, and as each of the cleaning holders moves along its movement route, the cleaning member thereof slides over an outer surface of a corresponding one of the transmissive members. Thus, the transmissive members are cleaned at one time.

Furthermore, there is known an optical scanning device in which two cleaning holders each holding two cleaning members are joined to a wire-shaped member, and as the wire-shaped member travels in a loop, the two cleaning holders move along transmissive members, so that the cleaning members of each of the cleaning holders also slide over a corresponding one of the transmissive members. Further, it is known that at one end of a movement route, each of the cleaning holders comes into contact with a stopper, thus stopping the wire-shaped member from traveling.

SUMMARY

An optical scanning device according to one aspect of the present disclosure includes a housing, a transmissive member, a wire-shaped member, a driving portion, a cleaning holder, a cleaning member, a stopper, and a control portion. The optical scanning device irradiates an image carrier with laser light so as to form an electrostatic latent image. In the housing, an emission port for laser light is formed to extend in a main scanning direction of the laser light so as to correspond to the image carrier. The transmissive member has a transmission property with respect to the laser light, extends in the main scanning direction of the laser light, and seals the emission port for the laser light. The wire-shaped member is stretched in a loop on the housing. The driving portion drives the wire-shaped member to travel in a first direction and a second direction. The cleaning holder is fixed to the wire-shaped member and, when the wire-shaped member is driven to travel in a loop by the driving portion, moves in an extending direction of the transmissive member. The cleaning member is fixed to the cleaning holder and, as the cleaning holder moves, slides with respect to the transmissive member, thus cleaning the transmissive member. The stopper is disposed at an end of a movement route of the cleaning holder and restricts movement of the cleaning holder. The control portion controls driving of the driving portion. The control portion is capable of executing a cleaning mode including at least one of a forward travel operation of controlling the wire-shaped member to travel in the first direction so that the cleaning holder moves along the extending direction of the transmissive member and a backward travel operation of, after executing the forward travel operation, controlling the wire-shaped member to travel in the second direction so that the cleaning holder moves in an opposite direction to a direction of the forward travel operation. After executing the cleaning mode, the control portion executes a load releasing operation of controlling the cleaning holder to move by a prescribed amount in an opposite direction to the direction of the forward travel operation or the backward travel operation as a final operation in the cleaning mode.

Still other objects of the present disclosure and specific advantages provided by the present disclosure will be made further apparent from the following description of an embodiment.

DETAILED DESCRIPTION

Figure 1:
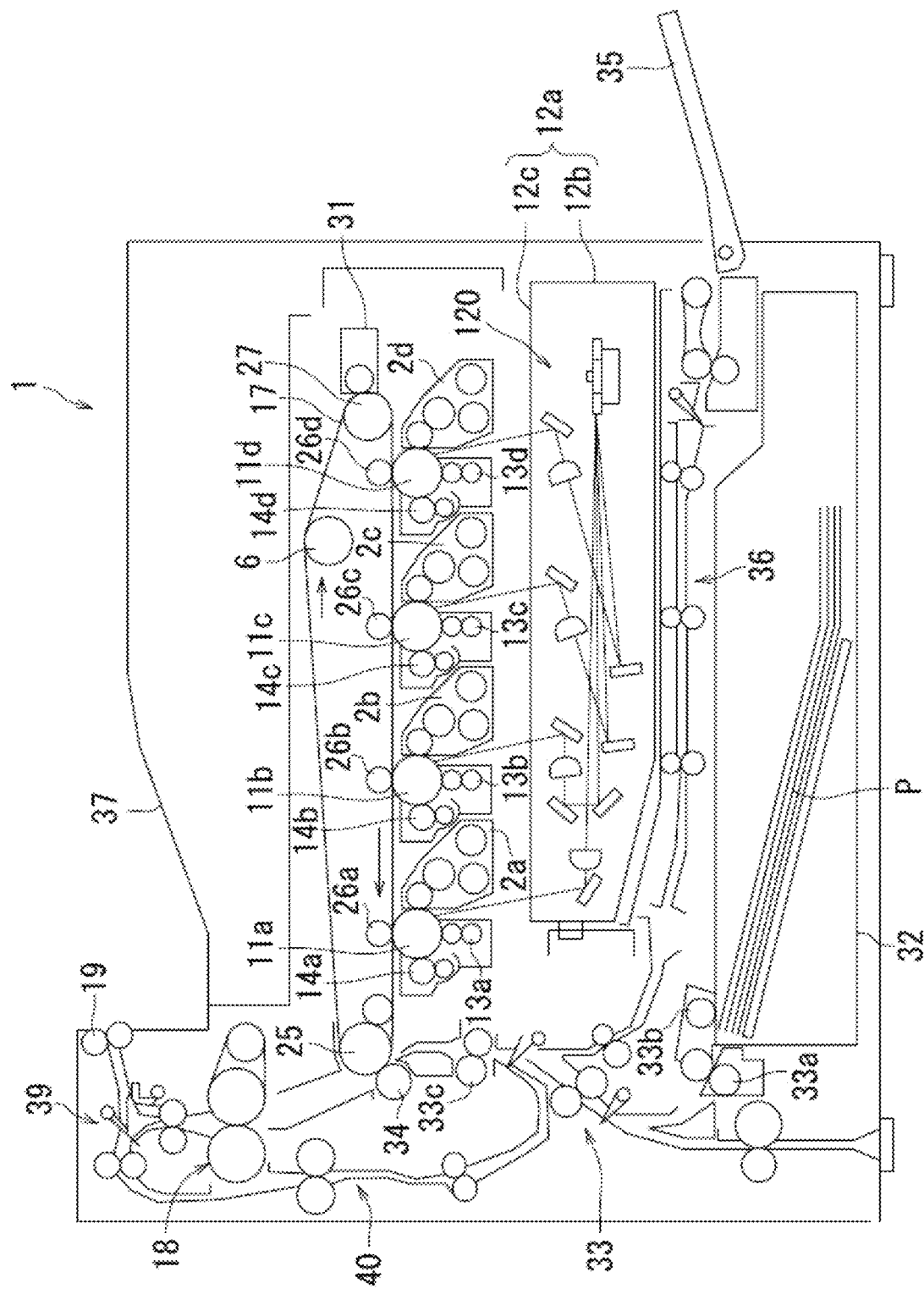
FIG. 1 is a sectional view schematically showing an overall configuration of an image forming apparatus in which an optical scanning device of the present disclosure is incorporated.

With reference to the appended drawings, the following describes an embodiment of the present disclosure. FIG. 1 is a sectional view schematically showing an overall configuration of an image forming apparatus 1 in which an optical scanning device of the present disclosure is incorporated. The image forming apparatus 1 is a tandem-type color printer. The image forming apparatus 1 includes rotatable photosensitive drums 11a to 11d as image carriers. Each of the photosensitive drums 11a to 11d is formed of, for example, an organic photosensitive member (an OPC photosensitive member) on which an organic photosensitive layer is formed or an amorphous silicon photosensitive member on which an amorphous silicon photosensitive layer is formed. The photosensitive drums 11a to 11d are disposed in a tandem manner so as to correspond to colors of magenta, cyan, yellow, and black, respectively.

A developer 2a, a charger 13a, and a cleaner 14a are provided around the photosensitive drum 11a. Similarly, developers 2b to 2d, chargers 13b to 13d, and cleaners 14b to 14d are provided around the photosensitive drums 11b to 11d, respectively. Furthermore, an optical scanning device 12 is provided below the developers 2a to 2d. Herein, directions indicated as "below" and "above" refer to a downward direction and an upward direction in the drawings, respectively.

The developers 2a to 2d are each disposed on a right side of a corresponding one of the photosensitive drums 11a to 11d. The developers 2a to 2d are each opposed to a corresponding one of the photosensitive drums 11a to 11d and supplies toner thereto. Herein, directions indicated as "right" and "left" refer to a rightward direction and a leftward direction in the drawings, respectively.

The chargers 13a to 13d are each disposed on an upstream side of a corresponding one of the developers 2a to 2d with respect to a rotation direction a corresponding one of the photosensitive drums 11a to 11d and are opposed to a surface of the corresponding one of the photosensitive drums 11a to 11d. The chargers 13a to 13d each uniformly charge the surface of the corresponding one of the photosensitive drums 11a to 11d.

Based on image data such as characters and patterns inputted from a personal computer or the like to an image input portion, the optical scanning device 12 irradiates with light (optically scans) the surface of each of the photosensitive drums 11a to 11d, which has been uniformly charged by a corresponding one of the chargers 13a to 13d, so as to form an electrostatic latent image on the surface of the each of the photosensitive drums 11a to 11d.

A housing 12a of the optical scanning device 12 includes a housing portion 12b having an opening in one surface thereof and a cover portion 12c covering the opening. A scanning optical system 120 is incorporated inside the housing portion 12b. In the cover portion 12c, emission ports for light (laser light) emitted from the scanning optical system 120 are formed so as to correspond to the photosensitive drums 11a to 11d, respectively. Moreover, as will be described later, the emission ports are each covered with a transmissive member 52 (see FIG. 2). The transmissive member 52 has a transmission property with respect to light emitted from the scanning optical system 120.

The scanning optical system 120 includes a laser light source (not shown) and a polygon mirror. The scanning optical system 120 also includes at least one reflection mirror and a lens so as to correspond to each of the photosensitive drums 11a to 11d. Laser light emitted from the laser light source is applied via the polygon mirror, the reflection mirrors, and the lenses to the surface of each of the photosensitive drums 11a to 11d from a downstream side of a corresponding one of the chargers 13a to 13d with respect to the rotation direction of a corresponding one of the photosensitive drums 11a to 11d. Thus, electrostatic latent images are formed on the surfaces of the photosensitive drums 11a to 11d, respectively. These electrostatic latent images are developed into toner images by the developers 2a to 2d, respectively.

An endless intermediate transfer belt 17 is stretched over a tension roller 6, a driving roller 25, and a driven roller 27. The driving roller 25 is caused to rotate by a motor (not shown), and thus the intermediate transfer belt 17 is circularly driven in a clockwise direction in FIG. 1.

The photosensitive drums 11a to 11d are arrayed below the intermediate transfer belt 17 adjacently to each other along a conveyance direction (an arrow direction in FIG. 1). Furthermore, the photosensitive drums 11a to 11d are in contact with the intermediate transfer belt 17. Primary transfer rollers 26a to 26d are opposed to the photosensitive drums 11a to 11d via the intermediate transfer belt 17, respectively. Each of the primary transfer rollers 26a to 26d is brought into pressure contact with the intermediate transfer belt 17 and forms, together with a corresponding one of the photosensitive drums 11a to 11d, a primary transfer portion. In these primary transfer portions, the toner images are transferred to the intermediate transfer belt 17. To be more specific, a primary transfer voltage is applied to each of the primary transfer rollers 26a to 26d, and thus the toner images on the photosensitive drums 11a to 11d are sequentially transferred to the intermediate transfer belt 17 at prescribed timing. Thus, on a surface of the intermediate transfer belt 17, a full-color toner image is formed in which the toner images of four colors of magenta, cyan, yellow, and black are overlaid on each other so as to be in a prescribed positional relationship.

A secondary transfer roller 34 is opposed to the driving roller 25 via the intermediate transfer belt 17. The secondary transfer roller 34 is brought into pressure contact with the intermediate transfer belt 17 and forms, together with the driving roller 25, a secondary transfer portion. In the secondary transfer portion, a secondary transfer voltage is applied to the secondary transfer roller 34, and thus the toner image on the surface of the intermediate transfer belt 17 is transferred to a sheet P. After the toner image has been transferred, a bet cleaner 31 cleans residual toner remaining on the intermediate transfer belt 17.

A paper feed cassette 32 is provided on a lower side in the image forming apparatus 1. The paper feed cassette 32 is capable of housing therein a plurality of sheets P. A stack tray 35 for manual paper feeding is provided on a right side of the paper feed cassette 32. A first sheet conveyance path 33 is provided on a left side of the paper feed cassette 32. The first sheet conveyance path 33 conveys the sheet P fed out from the paper feed cassette 32 to the secondary transfer portion. Furthermore, a second sheet conveyance path 36 is provided on a left side of the stack tray 35. The second sheet conveyance path 36 conveys the sheet P fed out from the stack tray 35 to the secondary transfer portion. Moreover, a fixing portion 18 and a third sheet conveyance path 39 are provided on an upper left side in the image forming apparatus 1. The fixing portion 18 performs a fixing process with respect to the sheet P on which an image has been formed. The third sheet conveyance path 39 conveys the sheet P that has been subjected to the fixing process to a sheet discharge portion 37.

The sheet P housed in the paper feed cassette 32 is fed out one by one by a pick-up roller 33b and a separating roller pair 33a toward the first sheet conveyance path 33.

The first sheet conveyance path 33 and the second sheet conveyance path 36 merge together before reaching a registration roller pair 33c (on an upstream side thereof). The registration roller pair 33c conveys the sheet P to the secondary transfer portion so that an image forming operation on the intermediate transfer belt 17 is timed with an operation of paper feeding to the secondary transfer portion. By the secondary transfer roller 34 to which the secondary transfer voltage has been applied, the full-color toner image on the intermediate transfer belt 17 is secondarily transferred to the sheet P conveyed to the secondary transfer portion. The sheet P to which the full-color toner image has been transferred is conveyed to the fixing portion 18.

The fixing portion 18 includes a fixing belt that is heated by a heater, a fixing roller that is internally in contact with the fixing belt, a pressing roller that is brought into pressure contact with the fixing roller via the fixing belt, and so on. The fixing portion 18 applies heat and pressure to the sheet P to which the toner image has been transferred. Thus, the fixing process is implemented. Where necessary, front and back sides of the sheet P to which the toner image has been fixed in the fixing portion 18 are reversed in a fourth sheet conveyance path 40. After that, the sheet P is conveyed again to the secondary transfer portion via the registration roller pair 33c, and then a new toner image is secondarily transferred to the back side of the sheet P by the secondary transfer roller 34 and fixed in the fixing portion 18. The sheet P on which the toner image has been fixed passes through the third sheet conveyance path 39 to be discharged by a discharge roller pair 19 to the sheet discharge portion 37.

Figure 2:
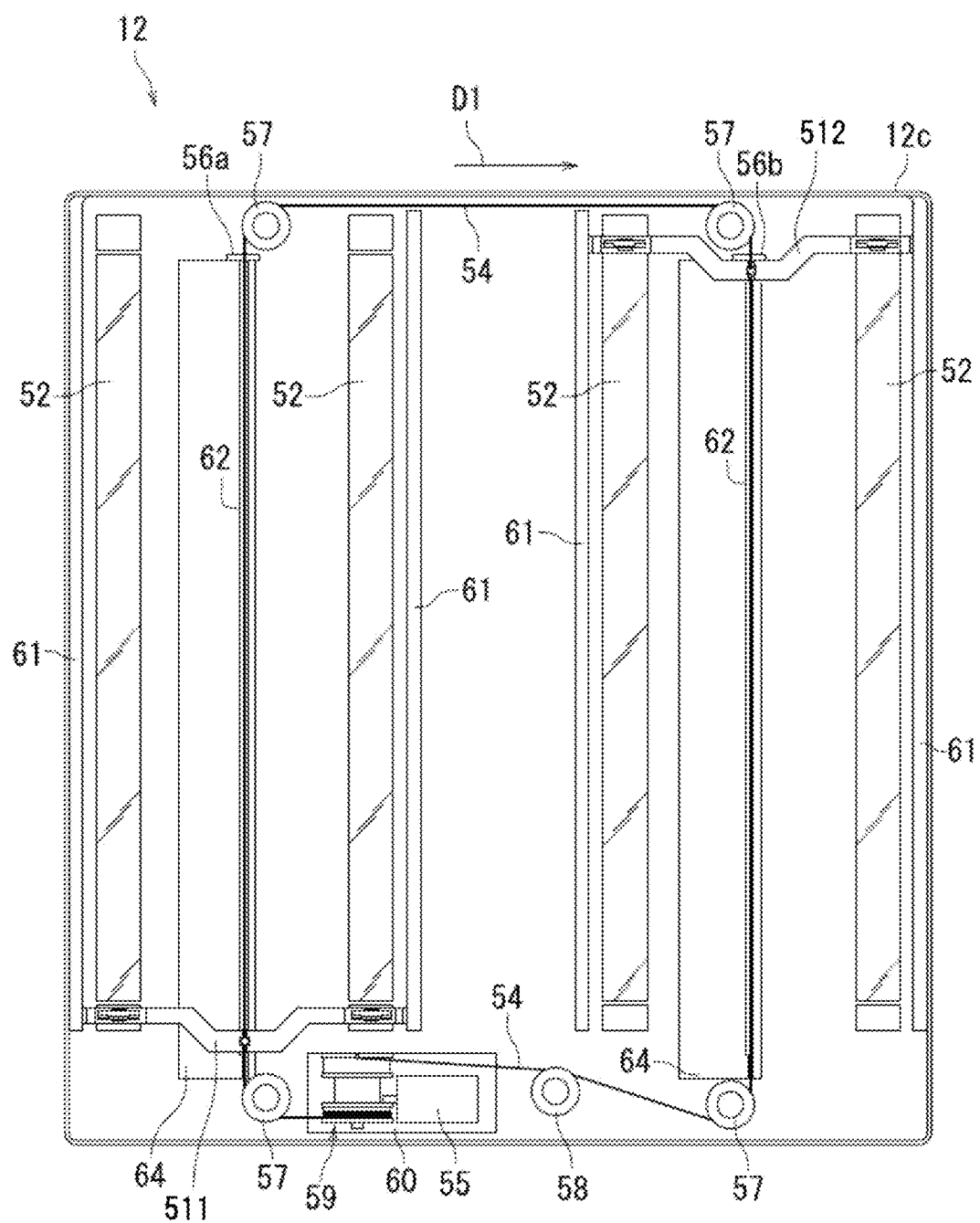
FIG. 2 is a plan view showing a cover portion of the optical scanning device according to one embodiment of the present disclosure.
Figure 3:
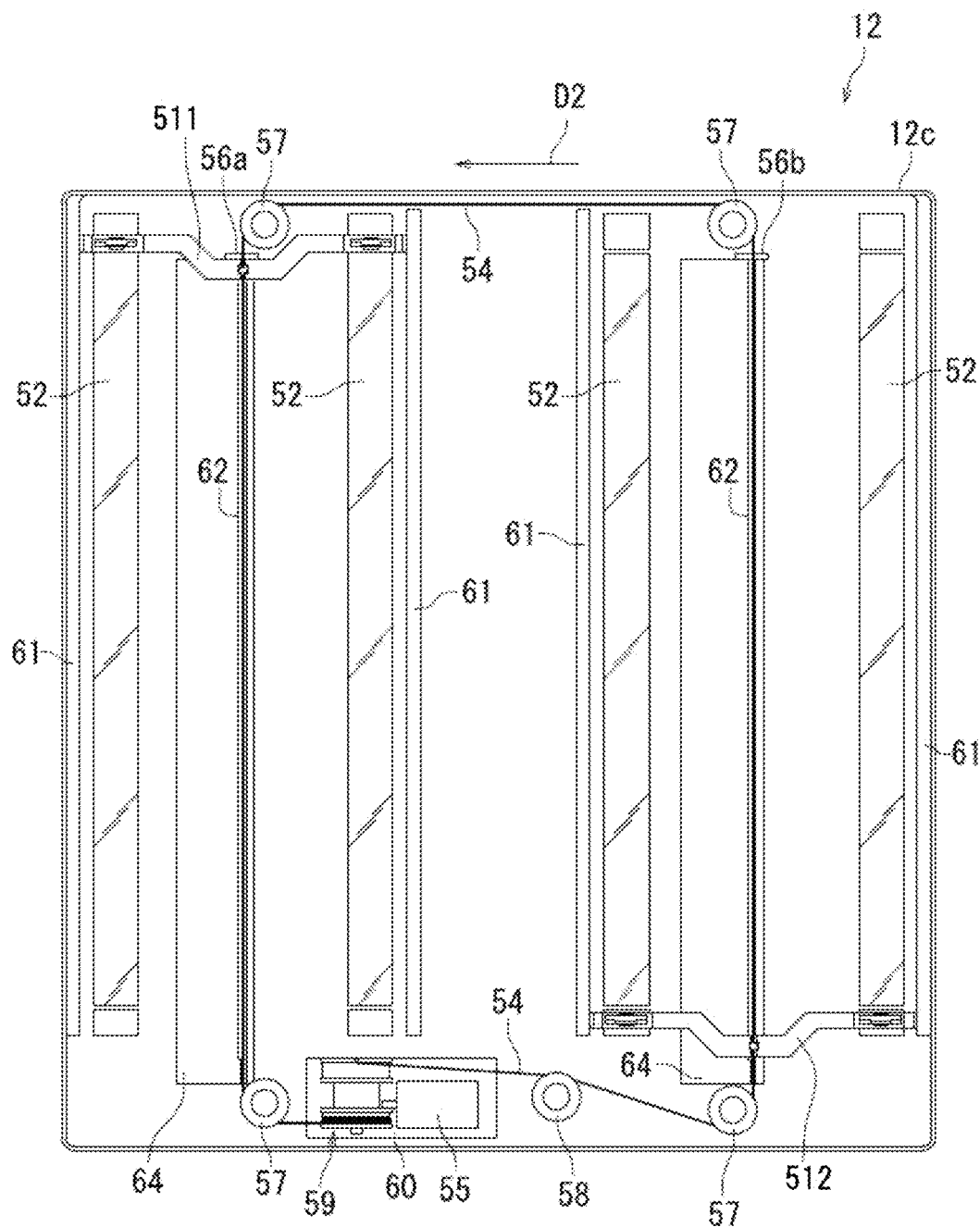
FIG. 3 is a plan view for explaining an operation of a cleaning holder provided on the cover portion in the optical scanning device of this embodiment.
Figure 4:
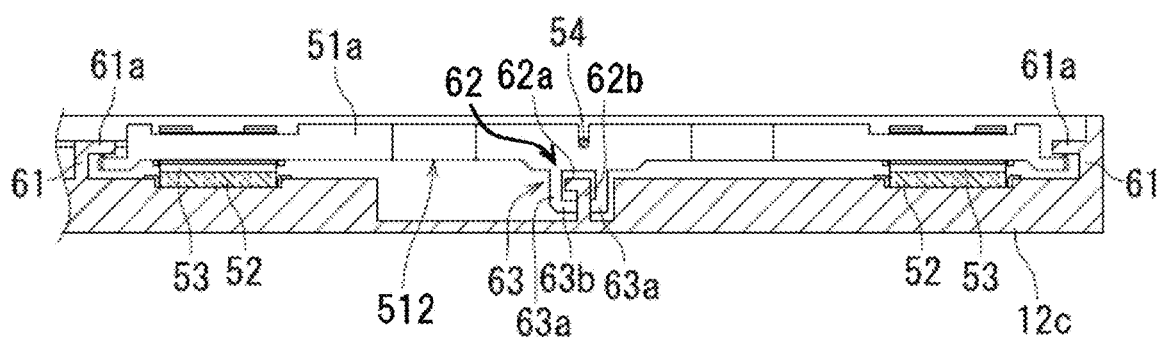
FIG. 4 is a sectional view of part of the cover portion in the optical scanning device of this embodiment as seen from a movement direction of the cleaning holder.

Next, with reference to FIG. 2, FIG. 3, and FIG. 4, a description is given of the optical scanning device 12. FIG. 2 is a plan view showing the cover portion 12c of the optical scanning device 12. FIG. 3 is a plan view for explaining an operation of a cleaning holder 51 provided on the cover portion 12c. FIG. 4 is a sectional view of part of the cover portion 12c as seen from a movement direction of the cleaning holder 51, in which the cleaning holder 51 is viewed from a front thereof.

As described above, the housing 12a of the optical scanning device 12 includes the housing portion 12b and the cover portion 12c attached to cover the housing portion 12b, and in the cover portion 12c, four emission ports for laser light are juxtaposed so as to correspond to the four photosensitive drums 11a to 11d, respectively. Each of the emission ports has a rectangular shape elongated in a main scanning direction of a corresponding ray of laser light, and the emission ports are formed so that longitudinal directions thereof are parallel to each other. The emission ports are each sealed by the rectangular plate-shaped transmissive member 52. The four transmissive members 52 are juxtaposed so that longitudinal directions thereof are parallel to each other. The transmissive members 52 are provided so as to prevent entry of toner, dust, or the like into the optical scanning device 12. Each of the transmissive members 52 is, for example, a glass cover.

The optical scanning device 12 includes two cleaning holders that are a first cleaning holder 511 and a second cleaning holder 512.

Each of the cleaning holders 511 and 512 has a holding portion 51a (see FIG. 4). The holding portion 51a extends astride a corresponding pair of adjacent two of the transmissive members 52 and holds two cleaning members 53. The cleaning holders 511 and 512 are provided on an outer surface of the cover portion 12c (a surface thereof near the photosensitive drums 11a to 11d). The cleaning members 53 are held to the holding portions 51a so as to be disposed to correspond to the transmissive members 52, respectively. Each of the cleaning members 53 is, for example, a rubber pod. The rubber pad can be made of, for example, a silicone rubber. Each of the cleaning holders 511 and 512 is formed of, for example, resin. The cleaning members 53 are not limited to the rubber pad and may be made of, for example, a non-woven fabric.

The cleaning holders 511 and 512 are joined to a wire-shaped member 54 that is stretched in a loop so as to pass through between each pair of adjacent two of the transmissive members 52. The wire-shaped member 54 is driven to travel in a loop by a driving force of a winding motor 55 that is a driving portion. The wire-shaped member 54 is, for example, a wire.

As the wire-shaped member 54 travels in a loop, the four cleaning members 53 slide over outer surfaces of the four transmissive members 52 (surfaces thereof near the photosensitive drums 11a to 11d). Thus, the outer surfaces of the transmissive members 52 are cleaned at one time by the cleaning members 53 corresponding thereto, respectively.

The winding motor 55 is capable of positive and negative rotations. Thus, it becomes possible to repeatedly implement a process of cleaning the transmissive members 52. In this embodiment, in one cleaning process, the winding motor 55 is caused to rotate positively and negatively so that, along the longitudinal direction of each of the transmissive members 52, corresponding two of the cleaning members 53 reciprocate. When the image forming apparatus 1 is in a maintenance mode, a user inputs a process start instruction from an operation portion 80 (see FIG. 5) or a host apparatus such as a personal computer and thus executes the cleaning process. Furthermore, the cleaning process may be executed periodically, for example, every time printing (image formation) of about 10,000 sheets has been implemented.

In this embodiment, as the wire-shaped member 54 travels in a loop, the first cleaning holder 511 and the second cleaning holder 512 move linearly in opposite directions to each other along the longitudinal directions of the transmissive members 52 (a main scanning direction of laser light). A first stopper 56a is provided at one end of a movement route of the first cleaning holder 511, and a second stopper 56b is provided at one end of a movement route of the second cleaning holder 512. Each of the first stopper 56a and the second stopper 56b is provided between a corresponding pair of adjacent two of the transmissive members 52 on one side in the longitudinal directions of the transmissive members 52. When the first cleaning holder 511 or the second cleaning holder 512 moves to the one end of the movement route thereof to come into contact with a corresponding one of the first stopper 56a or the second stopper 56b, the wire-shaped member 54 is stopped from traveling. When the wire-shaped member 54 is stopped from traveling, and thus there occurs an increase in load acting on the winding motor 55, a rotation direction of the winding motor 55 is reversed, or the winding motor 55 is stopped from operating. The first stopper 56a and the second stopper 56b can be made of, for example, resin. When formed of resin, the first stopper 56a and the second stopper 56b may be formed integrally with the cover portion 12c.

Here, with reference to FIG. 2 and FIG. 3, a description is given of an operation of the cleaning holders 511 and 512 performed in one cleaning process. In this embodiment, as described earlier, in one cleaning process, along the longitudinal direction of each of the transmissive members 52, corresponding two of the cleaning members 53 reciprocate once. Here, a description is given of a case where during a cleaning process, a travel direction of the wire-shaped member 54 changes from a direction indicated by an arrow D1 (a first direction) to a direction indicated by an arrow D2 (a second direction).

Upon the start of a cleaning process, the wire-shaped member 54 travels in the first direction indicated by the arrow D1 (see FIG. 2). Thus, the first cleaning holder 511 and the second cleaning holder 512 move from their respective positions shown in FIG. 2 to their respective positions shown in FIG. 3, and the first cleaning holder 511 comes into contact with the first stopper 56a at one end of the movement route thereof. As a result, the wire-shaped member 54 is stopped from traveling, thus stopping the first cleaning holder 511 and the second cleaning holder 512. At this time, there occurs an increase in load acting on the winding motor 55.

In response to this increase in load, the rotation direction of the winding motor 55 is reversed, and thus the wire-shaped member 54 travels in the second direction (an opposite direction to the first direction) indicated by the arrow D2 (see FIG. 3). Further, the first cleaning holder 511 and the second cleaning holder 512 move from their respective positions shown in FIG. 3 to their respective positions shown in FIG. 2, and the second cleaning holder 512 comes into contact with the second stopper 56b at one end of the movement route thereof. As a result, the wire-shaped member 54 is stopped from traveling, thus stopping the first cleaning holder 511 and the second cleaning holder 512 from operating. At this time, there occurs an increase in load acting on the winding motor 55. In response to this increase in load, the winding motor 55 is stopped.

Furthermore, during a cleaning process, the two cleaning members 53 held to each of the cleaning holders 511 and 512 move in the same direction. Here, assuming a case where each cleaning holder holds one cleaning member 53, the same number of cleaning holders as the number of the transmissive members 52 are required, and thus compared with a case where, as in this embodiment, each cleaning holder holds a plurality of cleaning members 53, a length of the wire-shaped member 54 required for causing the cleaning holders to move is increased. According to this embodiment, the number of cleaning holders used can be reduced, and a length of the wire-shaped member 54 required can be also decreased, so that a reduction in manufacturing cost can be achieved.

Furthermore, in this embodiment, four stretching pulleys 57 are rotatably held on the outer surface of the cover portion 12c. The four stretching pulleys 57 are provided so as to stretch the wire-shaped member 54 in a prescribed loop shape. Furthermore, a tension adjustment pulley 58 is rotatably held on the outer surface of the cover portion 12c. The wire-shaped member 54 is stretched in a loop among the plurality of stretching pulleys 57 and the tension adjustment pulley 58. To be more specific, by the four stretching pulleys 57, the wire-shaped member 54 is stretched so that, between each pair of adjacent two of the transmissive members 52, it is parallel to the longitudinal directions of the each pair of adjacent two of the transmissive members 52. The tension adjustment pulley 58 is one example of a tension adjustment mechanism. The tension adjustment pulley 58 is provided so as to adjust a tensional force to be applied to the wire-shaped member 54. In this manner, the rotatable pulleys 57 and 58 are used to stretch the wire-shaped member 54 in a loop, and thus the wire-shaped member 54 can be caused to travel smoothly in a loop.

Furthermore, the wire-shaped member 54 is wound multiple times around a winding drum 59, and the winding motor 55 causes the winding drum 59 to rotate, thus causing the wire-shaped member 54 to travel in a loop. The winding motor 55 and the winding drum 59 are disposed within a concave 60 formed in the cover portion 12c. To be more specific, within the concave 60, the winding drum 59 is rotatably held to the cover portion 12c. Within the concave 60, the winding motor 55 is fixed to the cover portion 12c. The winding motor 55 may be fixed to the housing portion 12b.

Furthermore, the cleaning holders 511 and 512 engage with the cover portion 12c so as to be movable along the longitudinal directions of the transmissive members 52. With reference to FIG. 2 and FIG. 4, the following describes one example of engagement between the cleaning holders 511 and 512 and the cover portion 12c.

As shown in FIG. 2 and FIG. 4, in this embodiment, two pairs of guide rails (guide members) 61 are provided on the outer surface of the cover portion 12c so as to correspond to the cleaning holders 511 and 512, respectively. Each of the two pairs of guide rails 61 is one example of a first guide member. The guide rails 61 are provided to extend along the longitudinal directions of the transmissive members 52, and both ends (the holding portion 51a) of each of the cleaning holders 511 and 512 engage with a corresponding one of the two pairs of guide rails 61. Each of the cleaning holders 511 and 512 is guided along the longitudinal directions of the transmissive members 52 by a corresponding one of the two pairs of guide rails 61. Accordingly, the cleaning holders 511 and 512 can be caused to move stably along the longitudinal directions of the transmissive members 52.

Furthermore, each of the guide rails 61 is provided with a latch part 61a protruding toward a corresponding one of the cleaning holders 511 and 512. The latch parts 61a are provided to extend along the longitudinal directions of the transmissive members 52. In such a direction as to separate from the housing 12a of the optical scanning device 12 (an upward direction in FIG. 4), the both ends of the holding portion 51a of each of the cleaning holders 511 and 512 are latched onto the latch parts 61a of a corresponding one of the two pairs of guide rails 61, and thus upward movement (displacement) of the cleaning holders 511 and 512 is restricted. Furthermore, with the latch parts 61a provided, it is possible to prevent the cleaning holders 511 and 512 from falling off from the cover portion 12c and also to stably bring a corresponding one of the cleaning members 53 into tight contact with each of the transmissive members 52. More preferably, the latch parts 61a are provided so that the both ends of the holding portion 51a of each of the cleaning holders 511 and 512 are always kept in contact, respectively, with the latch parts 61a of a corresponding one of the two pairs of guide rails 61. Thus, each of the cleaning members 53 can be pressed against a corresponding one of the transmissive members 52. Accordingly, it becomes possible to more stably bring each of the cleaning members 53 into tight contact with a corresponding one of the transmissive members 52.

Moreover, in this embodiment, two guide ribs (guide members) 62 are provided in a protruding manner on the outer surface of the cover portion 12c so as to correspond to the cleaning holders 511 and 512, respectively. Each of the guide ribs 62 is one example of a second guide member. Each of the guide ribs 62 is provided to extend between a corresponding pair of adjacent two of the transmissive members 52 along the longitudinal directions of the transmissive members 52. On the other hand, an engagement part 63 is provided on a lower end side of each of the cleaning holders 511 and 512 and engages with a corresponding one of the guide ribs 62. Accordingly, by each of the guide ribs 62, a corresponding one of the cleaning holders 511 and 512 is guided along the longitudinal directions of the transmissive members 52. Thus, the cleaning holders 511 and 512 can be caused to move stably along the longitudinal directions of the transmissive members 52.

Desirably, each of the guide ribs 62 is disposed at a position as close as possible to the wire-shaped member 54. Thus, during a cleaning process, it is possible to further suppress shaking of the cleaning holders 511 and 512. That is, the cleaning holders 511 and 512 can be caused to move more stably along the longitudinal directions of the transmissive members 52. More preferably, each of the guide ribs 62 is provided immediately below the wire-shaped member 54. Thus, it is possible to even further suppress shaking of the cleaning holders 511 and 512 during a cleaning process.

In this embodiment, the wire-shaped member 54 is joined to an upper end side of the holding portion 51a of each of the cleaning holders 511 and 512, and each of the engagement parts 63 is provided on a lower end side of the holding portion 51a of a corresponding one of the cleaning holders 511 and 512. Thus, an engagement section between each of the guide ribs 62 and a corresponding one of the engagement parts 63 can be provided immediately below a joint section between a corresponding one of the cleaning holders 511 and 512 and the wire-shaped member 54.

Furthermore, in this embodiment, as shown in FIG. 4, each of the engagement parts 63 includes a pair of protruding parts 63a protruding downward from a corresponding one of the cleaning holders 511 and 512, and each of the guide ribs 62 is held between a corresponding one of the pairs of protruding parts 63a. Thus, it is possible to restrict movement of the cleaning holders 511 and 512 in a left-right direction. Furthermore, it is possible to limit shaking of each of the cleaning holders 511 and 512 around an axis extending in an up-down direction thereof (shaking in a movement direction of each of the cleaning holders 511 and 512).

Furthermore, in this embodiment, each of the guide ribs 62 has a protruding part 62b protruding from the cover portion 12c and a latch part 62a provided in a protruding manner at a tip end of the protruding part 62b. The latch part 62a extends in a leftward direction (one direction in an extending direction of the holding portion 51a) from the tip end of the protruding part 62b. On the other hand, each of the cleaning holders 511 and 512 has a latch part 63b that extends in a rightward direction (the other direction in the extending direction of the holding portion 51a) from one of the pair of protruding parts 63a of each of the engagement parts 63 and engages with the latch part 62a of each of the guide ribs 62. Thus, it is possible to restrict upward movement of the cleaning holders 511 and 512. Furthermore, it is possible to prevent the cleaning holders 511 and 512 from falling off from the cover portion 12c.

In a case where the both ends of the holding portion 51a of each of the cleaning holders 511 and 512 are always kept in contact, respectively, with the latch parts 61a of a corresponding one of the two pairs of guide rails 61 so that each of the cleaning members 53 is in tight contact with a corresponding one of the transmissive members 52, the cleaning holders 511 and 512 may be deformed into an arc shape. In a case where the cleaning holders 511 and 512 are deformed into an arc shape, on a center side of each of the cleaning holders 511 and 512, any of the cleaning members 53 may separate from a corresponding one of the transmissive members 52. As a solution to this, in this embodiment, the cover portion 12c includes the latch part 62a, and each of the cleaning holders 511 and 512 includes the latch part 63b. Therefore, when the cleaning holders 511 and 512 are deformed into an arc shape, in such a direction as to separate from the housing 12a of the optical scanning device 12, the latch part 63b of a corresponding one of the cleaning holders 511 and 512 is latched onto the latch part 62a of each of the guide ribs 62, and thus deformation of the cleaning holders 511 and 512 into an arc shape is suppressed. As a result, a corresponding one of the cleaning members 53 can be stably brought into tight contact with each of the transmissive members 52. More preferably, below a position at which the transmissive members 52 are disposed, the latch part 63b of a corresponding one of the cleaning holders 511 and 512 (the engagement parts 63) is latched onto the latch part 62a of each of the guide ribs 62. Thus, it is possible to enhance an effect of suppressing deformation of the cleaning holders 511 and 512 into an arc shape.

Figure 5:
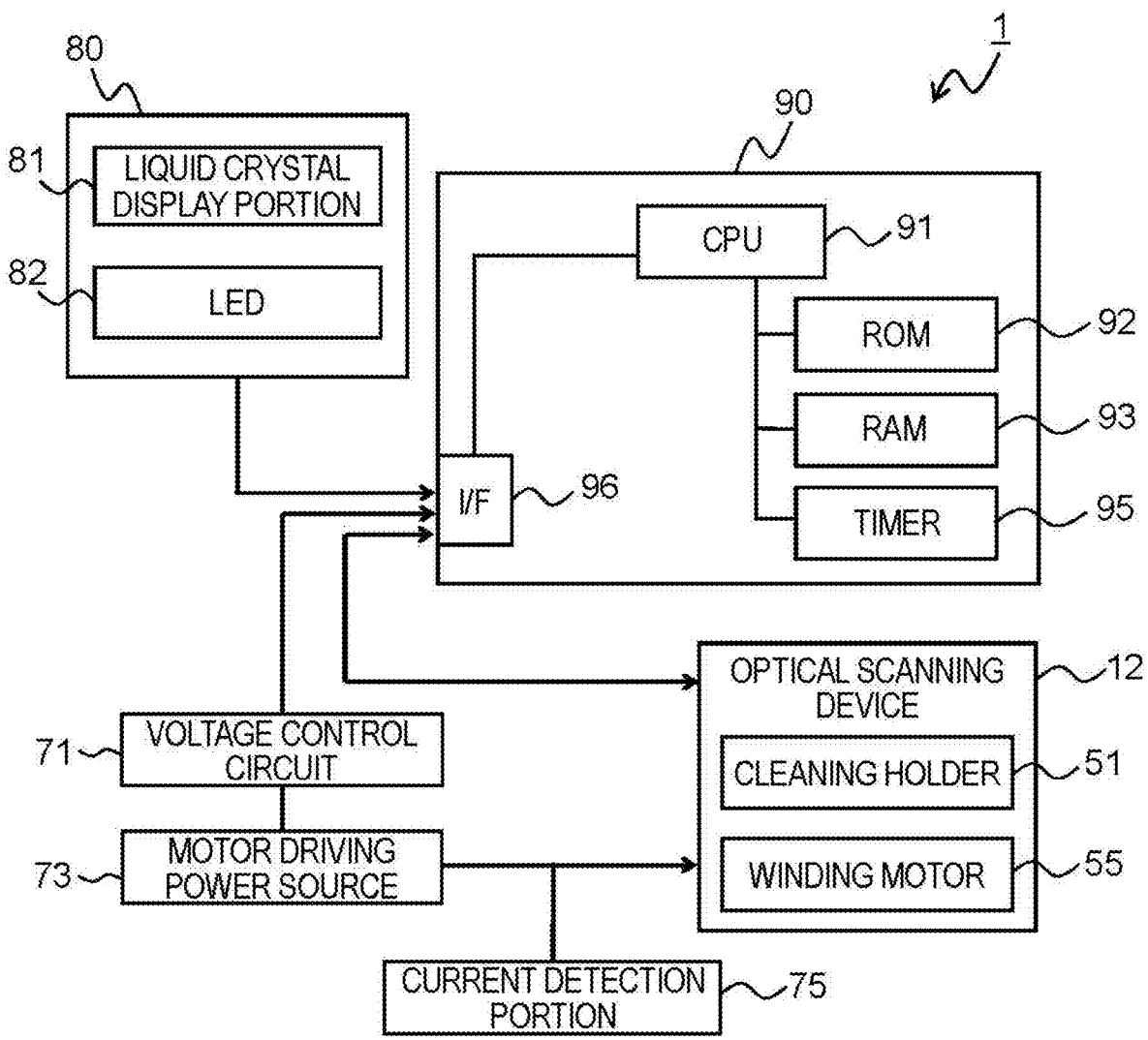
FIG. 5 is a block diagram showing one example of a control route used for the image forming apparatus.

FIG. 5 is a block diagram showing one example of a control route used for the image forming apparatus 1. In using the image forming apparatus 1, the various portions of the apparatus are controlled in different ways, and thus control routes for the image forming apparatus 1 as a whole are complicated. The description, therefore, focuses on those ones of the control routes which are necessary in implementing the present disclosure.

A voltage control portion 71 is connected to a motor driving power source 73 and, based on an output signal from a control portion 90, operates the motor driving power source 73. Based on a control signal from the voltage control portion 71, the motor driving power source 73 applies a prescribed driving voltage to the winding motor 55 in the optical scanning device 12. A current detection portion 75 detects a driving current that flows when a driving voltage is applied to the winding motor 55.

In the operation portion 80, there are provided a liquid crystal display portion 81 and LEDs 82 that indicate various types of statuses, and the operation portion 80 is configured to indicate a status of the image forming apparatus 1 and to display an image forming situation or the number of sheets printed. Various types of setting for the image forming apparatus 1 are performed from a printer driver of a personal computer.

The control portion 90 includes at least a CPU (central processing unit) 91 as a central processor, a ROM (read-only memory) 92 that is a read-only storage portion, a RAM (random access memory) 93 that is a readable/writable storage portion, a timer 95, and an I/F (interface) 96 that transmits a control signal to various devices in the image forming apparatus 1 and receives an input signal from the operation portion 80.

The ROM 92 contains, for example, data that would not be changed during use of the image forming apparatus 1, such as control programs for the image forming apparatus 1 or numerical values necessary for controlling the image forming apparatus 1. The RAM 93 stores, for example, necessary date generated while control of the image forming apparatus 1 is in progress or data temporarily required for controlling the image forming apparatus 1. Furthermore, the RAM 93 (or the ROM 92) also stores, for example, a voltage value (a duty) applied to the winding motor 55 in each of after-mentioned operation modes of the cleaning holder 51 or a driving time of the winding motor 55 during cleaning of the transmissive members 52 of the optical scanning device 12. The timer 95 measures the driving time of the winding motor 55.

As described earlier, in this embodiment, when the second cleaning holder 512 has come into contact with the second stopper 56b, the winding motor 55 is stopped. Because of this, a tension (a load) Is undesirably kept applied to the wire-shaped member 54 until a next cleaning operation is executed. As a result, there is a possibility that a stretch occurs in the wire-shaped member 54 and, in a worst case scenario, the wire-shaped member 54 breaks.

As a solution to this, in this embodiment, during cleaning of the transmissive members 52 by the first cleaning holder 511 and the second cleaning holder 512 (hereinafter, referred to as a cleaning mode), subsequent to a reciprocating operation of the first cleaning holder 511 and the second cleaning holder 512 that constitutes the cleaning mode, a load releasing operation is performed so that a load applied to the wire-shaped member 54 is released at the end of the cleaning mode. Thus, it is possible to use a less costly wire as the wire-shaped member 54 and also to extend a service life of the wire-shaped member 54. The following describes in detail driving control of the winding motor 55 in the cleaning mode.

Figure 6:
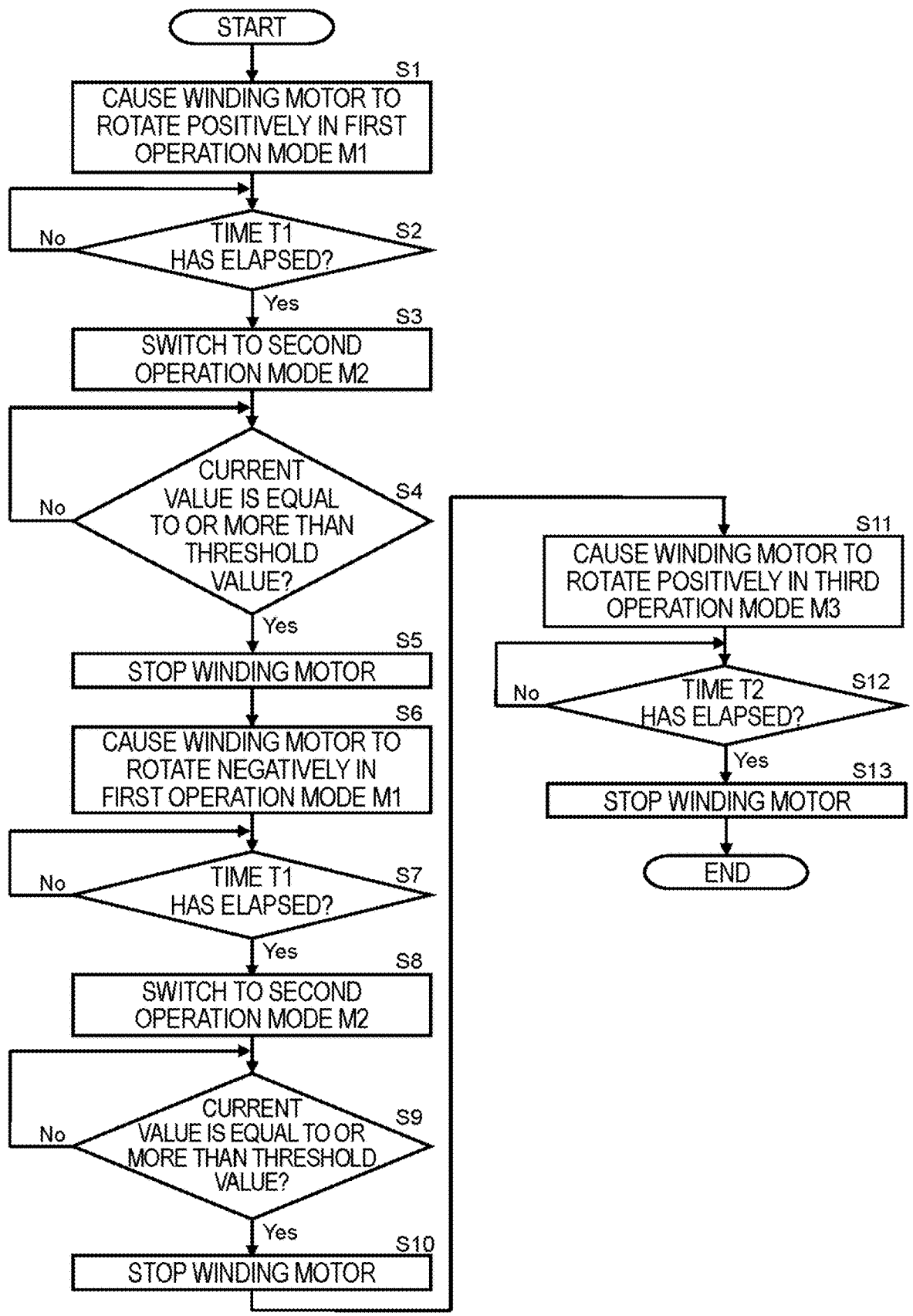
FIG. 6 is a flow chart showing a first control example of driving control of a winding motor in a cleaning mode.

FIG. 6 is a flow chart showing a first control example of driving control of the winding motor 55 in the cleaning mode. By referring to FIG. 1 to FIG. 5 as required, a description is given of the first control example of the winding motor 55 in accordance with steps shown in FIG. 6.

Upon the start of the cleaning mode, the control portion 90 transmits a control signal to the voltage control portion 71 so as to supply a driving voltage from the motor driving power source 73 to the winding motor 55. Thus, the winding motor 55 is caused to rotate positively in a first operation mode M1 (an initial operation mode) (Step S1). Here, driving control of the winding motor 55 is performed based on PWM (pulse width modulation) control, and in the first operation mode M1, a driving voltage having a duty of 100% is supplied from the motor driving power source 73. Concurrently therewith, the driving time of the winding motor 55 is started to be measured by the timer 95.

The winding motor 55 rotates positively to cause the wire-shaped member 54 to travel in the arrow D1 direction from a state shown in FIG. 2, so that the first cleaning holder 511 starts to move upward in FIG. 2 and the second cleaning holder 512 starts to move downward in FIG. 2.

Next, the control portion 90 determines whether or not a time T1 has elapsed since the start of the positive rotation of the winding motor 55 (Step S2). In a case where the time T1 has not elapsed yet (No at Step S2), the positive rotation of the winding motor 55 in the first operation mode M1 is continued.

In a case where the time T1 has elapsed (Yes at Step S2), the control portion 90 transmits a control signal to the voltage control portion 71 so that a mode of positive rotation driving of the winding motor 55 is switched to a second operation mode M2 (a final operation mode) that uses a driving torque smaller than that in the first operation mode M1 (Step S3). Specifically, a duty of a driving voltage supplied from the motor driving power source 73 is changed from 100% to 70%.

When, as shown in FIG. 3, the first cleaning holder 511 and the second cleaning holder 512 move to one ends of the movement routes thereof, respectively, the first cleaning holder 511 comes into contact with the first stopper 56a. At this time, a load acting on the winding motor 55 is increased, and a value of a driving current flowing through the winding motor 55 is increased. The control portion 90, then, determines whether or not a driving current value detected by the current detection portion 75 is equal to or more than a threshold value (Step S4). In a case where the driving current value is not equal to or more than the thresh hold value (No at Step S4), the positive rotation of the winding motor 55 in the second operation mode M2 is continued.

In a case where the driving current value is equal to or more than the threshold value (Yes at Step S4), upon determining that the first cleaning holder 511 and the second cleaning holder 512 have moved to the one ends of the movement routes thereof, respectively, the control portion 90 transmits a control signal to the voltage control portion 71 to stop the positive rotation of the winding motor 55 (Step S5). The above-described operations of Steps S1 to S5 constitute a forward travel operation performed by the first cleaning holder 511 and the second cleaning holder 512.

Next, the control portion 90 transmits a control signal to the voltage control portion 71 to supply a driving voltage from the motor driving power source 73 to the winding motor 55. Thus, the winding motor 55 is caused to rotate negatively in the first operation mode M1 (Step S6). Specifically, a driving voltage having a duty of 100% is supplied from the motor driving power source 73. Concurrently therewith, the driving time of the winding motor 55 is started to be measured by the timer 95.

The winding motor 55 rotates negatively to cause the wire-shaped member 54 to travel in the arrow D2 direction from a state shown in FIG. 3, so that the first cleaning holder 511 starts to move downward in FIG. 3 and the second cleaning holder 512 starts to move upward in FIG. 3

Next, the control portion 90 determines whether or not the time T1 has elapsed since the start of the negative rotation of the winding motor 55 (Step S7). In a case where the time T1 has not elapsed yet (No at Step S7), the negative rotation of the winding motor 55 in the first operation mode M1 is continued.

In a case where the time T1 has elapsed (Yes at Step S7), the control portion 90 transmits a control signal to the voltage control portion 71 so that a mode of negative rotation driving of the winding motor 55 is switched to the second operation mode M2 that uses a driving torque smaller than that in the first operation mode M1 (Step S8). Specifically, a duty of a driving voltage supplied from the motor driving power source 73 is changed from 100% to 70%.

When, as shown in FIG. 2, the first cleaning holder 511 and the second cleaning holder 512 move to the other ends of the movement routes thereof, respectively, the second cleaning holder 512 comes into contact with the second stopper 56b. At this time, a load acting on the winding motor 55 is increased, and a value of a driving current flowing through the winding motor 55 is increased. The control portion 90, then, determines whether or not a driving current value detected by the current detection portion 75 is equal to or more than a threshold value (Step S9). In a case where the driving current value is not equal to or more than the threshold value (No at Step S9), the negative rotation of the winding motor 55 in the second operation mode M2 is continued.

In a case where the driving current value is equal to or more than the threshold value (Yes at Step S9), upon determining that the first cleaning holder 511 and the second cleaning holder 512 have moved to the other ends of the movement routes thereof, respectively, the control portion 90 transmits a control signal to the voltage control portion 71 to stop the negative rotation of the winding motor 55 (Step S10). The above-described operations of Steps S6 to S10 constitute a backward travel operation performed by the first cleaning holder 511 and the second cleaning holder 512.

Next, the control portion 90 transmits a control signal to the voltage control portion 71 to supply a driving voltage from the motor driving power source 73 to the winding motor 55. Thus, the winding motor 55 is caused to rotate positively in a third operation mode M3 (Step S11). Specifically, a driving voltage having a duty of 100% is supplied from the motor driving power source 73. Concurrently therewith, the driving time of the winding motor 55 is started to be measured by the timer 95.

Next, the control portion 90 determines whether or not a time T2 has elapsed since the start of the positive rotation of the winding motor 55 (Step S12). In a case where the time T2 has not elapsed yet (No at Step S12), the positive rotation of the winding motor 55 in the third operation mode M3 is continued.

In a case where the time T2 has elapsed (Yes at Step S12), the positive rotation of the winding motor 55 in the third operation mode M3 is stopped. These operation of Steps S11 to S13 constitute a load releasing operation of releasing a tension (a load) on the wire-shaped member 54 after the backward travel operation.

According to the first control example shown in FIG. 6, after the end of the backward travel operation, the load releasing operation is performed in which the first cleaning holder 511 and the second cleaning holder 512 are caused to move by a prescribed amount in a forward travel direction, and thus the second cleaning holder 512 can be stopped in a state of being separated from the second stopper 56b. Accordingly, it is possible to avoid a state where a tension (a load) is kept applied to the wire-shaped member 54 and thus to suppress the occurrence of a stretch or a break in the wire-shaped member 54 even when the wire-shaped member 54 is formed of a less costly wire.

Furthermore, magnitudes of driving torques used respectively in the first operation mode M1, the second operation mode M2, and the third operation mode M3 are in the order M1, M3>M2, and thus a driving torque at the start of the load releasing operation is always larger than a driving torque at the end of the backward travel operation. It is thus possible to avoid the occurrence of a trouble that the winding motor 55 is brought into a locked state at the start of the load releasing operation. Furthermore, a driving torque at the start of the forward travel operation or the backward travel operation is always larger than a driving torque at the end of the forward travel operation or the backward travel operation, and thus it is possible to avoid the occurrence of a trouble that the winding motor 55 is brought into the locked state at the start of the cleaning mode and at a time of a transition from the forward travel operation to the backward travel operation during the cleaning mode.

At Steps S4 and S9 in FIG. 6, whether or not to continue a positive rotation and a negative rotation of the winding motor 55 in the second operation mode M2 is determined based on whether or not a driving current value detected by the current detection portion 75 is equal to or more than the threshold value. A configuration, however, may also be adopted in which a driving voltage value is detected instead of a driving current value, and this determination is made based on whether or not the driving voltage value is equal to or more than a threshold value.

Figure 7:
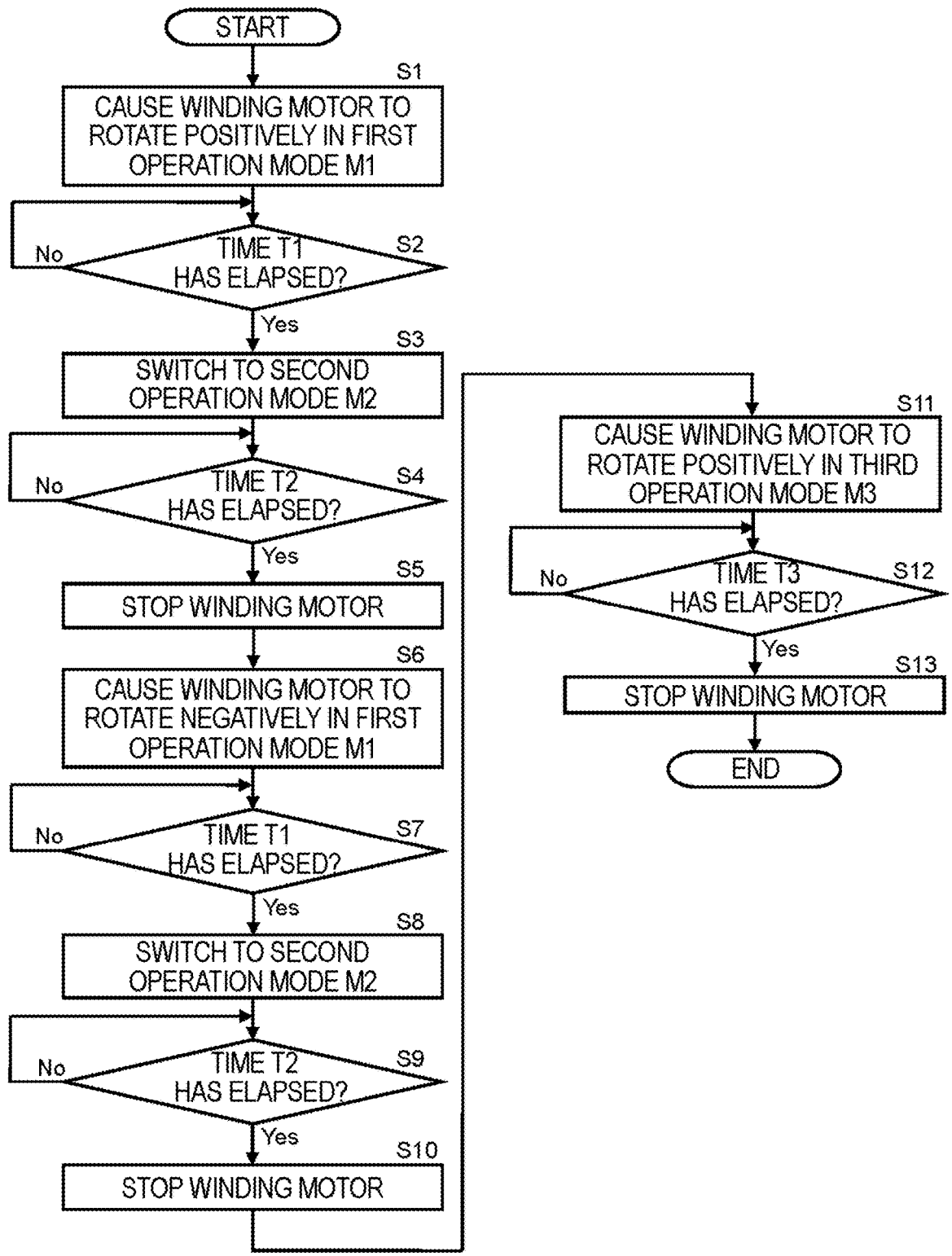
FIG. 7 is a flow chart showing a second control example of the driving control of the winding motor in the cleaning mode.

FIG. 7 is a flow chart showing a second control example of the driving control of the winding motor 55 in the cleaning mode. In the second control example shown in FIG. 7, the second operation mode M2 in the first control example shown in FIG. 6 is ended at a lapse of the time T2 (Steps S4 and S9), and the third operation mode M3 in the first control example shown in FIG. 6 is ended at a lapse of a time T3 (Step S12). Steps other than these are similar to those in the first control example.

According to the second control example, whether or not to end the second operation mode M2 in each of the forward travel operation and the backward travel operation of the first cleaning holder 511 and the second cleaning holder 512 is determined based on the driving time of the winding motor 55, and thus it is no longer needed to detect a driving current value or a driving voltage value of the winding motor 55. In order, however, to suppress variations in stop positions at which the first cleaning holder 511 and the second cleaning holder 512 are stopped, the first stopper 56a and the second stopper 56b are provided as shown in FIG. 2 and FIG. 3.

Also in the second control example shown in FIG. 7, the load releasing operation is performed in a similar manner to the first control example, and thus the second cleaning holder 512 can be stopped in a state of being separated from the second stopper 56b. Accordingly, it is possible to avoid the state where a tension (a load) is kept applied to the wire-shaped member 54 and thus to suppress the occurrence of a stretch or a break in the wire-shaped member 54 even when the wire-shaped member 54 is formed of a less costly wire.

Figure 8:
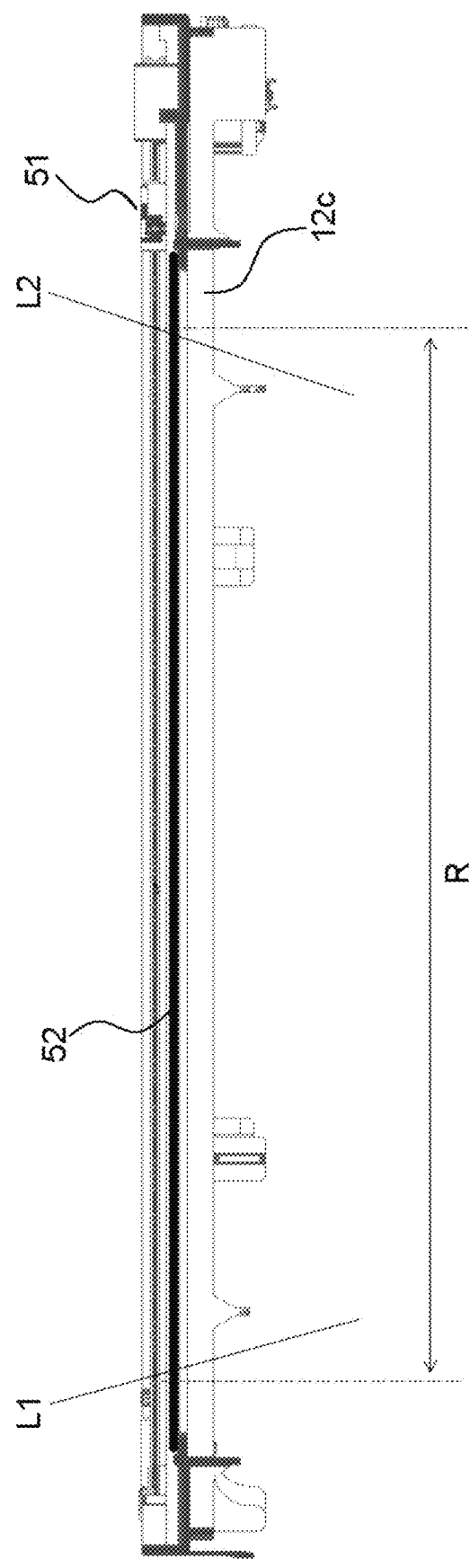
FIG. 8 is a sectional view of part of the cover portion in the optical scanning device of this embodiment as seen from a direction orthogonal to the movement direction of the cleaning holder.

FIG. 8 is a sectional view of part of the cover portion 12c In the optical scanning device 12 as seen from a direction orthogonal to the movement direction of the cleaning holder 51. In FIG. 8, each of reference characters L1 and L2 denotes an outermost angular light beam emitted from a laser light source (not shown) of the scanning optical system 120, and a region between an intersection of L1 and each of the transmissive members 52 and an intersection of L2 and each of the transmissive members 52 is defined as a light beam emission area R.

In a case of switching from the first operation mode M1 to the second operation mode M2 in each of the first control example and the second control example described above, when an operation mode switching position overlaps with the light beam emission area R shown in FIG. 8, a movement speed of each of the first cleaning holder 511 and the second cleaning holder 512 is decelerated at the switching position or each of the first cleaning holder 511 and the second cleaning holder 512 is stopped momentarily due to control limitations. This leads to a possibility of the occurrence of incomplete wiping by the cleaning members 53. As a solution to this, the time T1 is set so that the operation mode switching position does not overlap with the light beam emission area R. In the second control example, the times T1 and T2 are set so that T1<T2, and thus the first operation mode M1 is switched to the second operation mode M2 before the first cleaning holder 511 and the second cleaning holder 512 reach the right beam emission area R.

Furthermore, a relationship among the times T1, T2, and T3 is set so that T3<T1, T2 for the following reason. That is, when, at the end of the load releasing operation (the third operation mode M3), the stop positions of the first cleaning holder 511 and the second cleaning holder 512 overlap with the light beam emission area R shown in FIG. 8, laser light emitted from the scanning optical system 120 is blocked by the first cleaning holder 511 and the second cleaning holder 512, so that there is a possibility that a resulting image is partly omitted. As a solution to this, the time T3, which is a duration of the third operation mode M3, is reduced, and thus the first cleaning holder 511 and the second cleaning holder 512 are stopped before reaching the light beam emission area R.

Incidentally, in each of the first control example and the second control example described above, a duty of a driving voltage to be applied to the winding motor 55 in the third operation mode M3 in which the load releasing operation is performed is set to be equal (100%) to that in the first operation mode M1. In this case, while it is advantageously possible to avoid bringing the winding motor 55 into a locked state at the start of the third operation mode M3, there is a possibility that, due to an overly high torque, supposed stop positions at which the first cleaning holder 511 and the second cleaning holder 512 are supposed to be stopped at the end of the third operation mode M3 are overshot, so that the first cleaning holder 511 and the second cleaning holder 512 undesirably enter the light beam emission area R (see FIG. 8).

As a solution to this, in order to securely avoid a situation where the supposed stop positions of the first cleaning holder 511 and the second cleaning holder 512 are overshot, a duty of a driving voltage to be applied to the winding motor 55 in the third operation mode M3 can also be set to be equal (70%) to that in the second operation mode M2. In this case, although there is a possibility that the winding motor 55 is brought into a locked state at the start of the third operation mode M3, at the start of a next cleaning mode (the forward travel operation), driving is performed in the first operation mode M1 using a large driving torque, and thus there is no possibility that the winding motor 55 is brought into a locked state.

Figure 9:
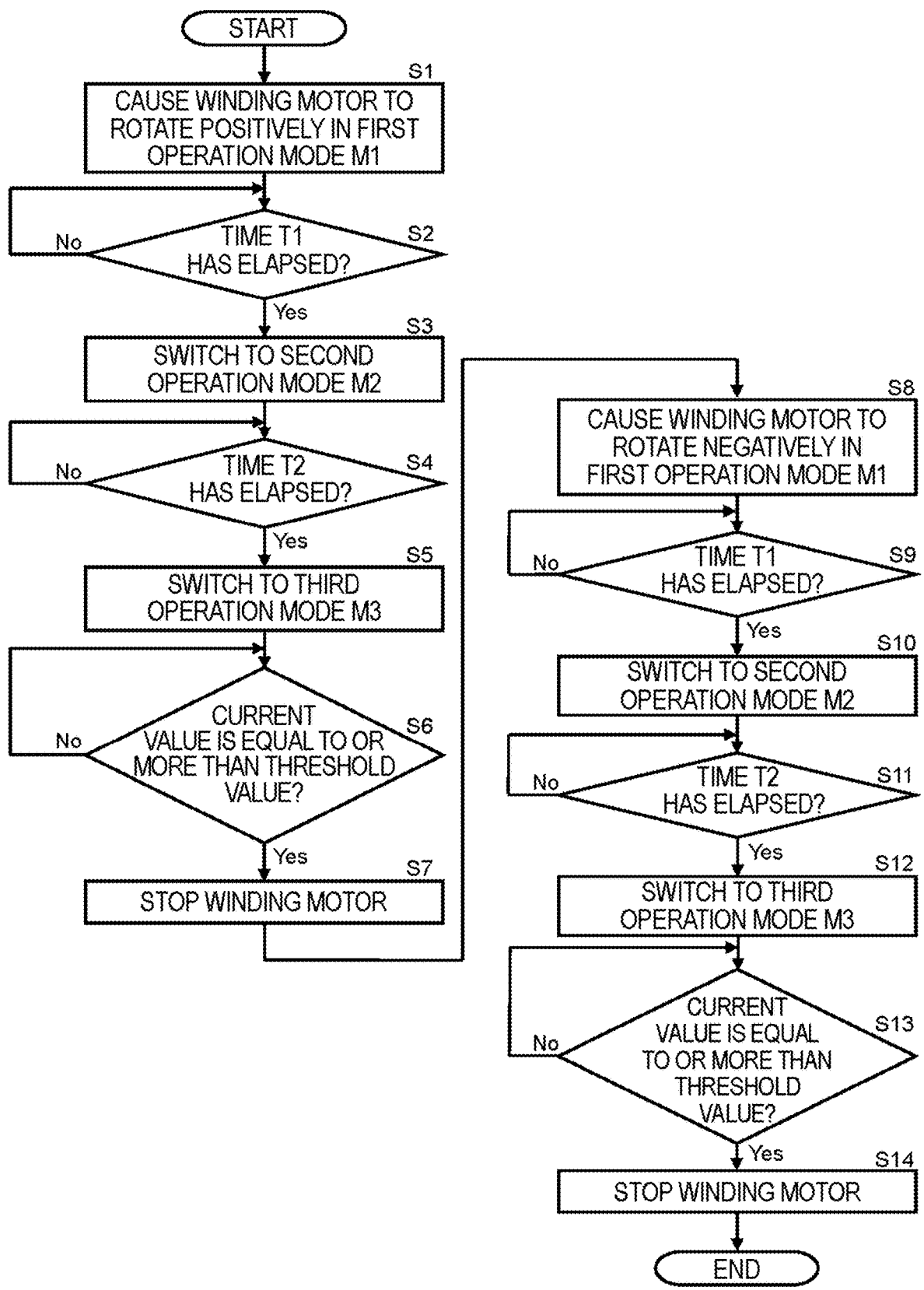
FIG. 9 is a flow chart showing a third control example of the driving control of the winding motor in the cleaning mode.

FIG. 9 is a flow chart showing a third control example of the driving control of the winding motor 55 in the cleaning mode. In the third control example shown in FIG. 9, in each of the forward travel operation and the backward travel operation, subsequently to the first operation mode M1 (the initial operation mode) and the second operation mode M2 (an intermediate operation mode), the third operation mode M3 (the final operation mode) is executed (Steps S and S12). Then, based on whether or not a driving current value detected by the current detection portion 75 is equal to or more than a threshold value, it is determined whether or not to continue positive rotation driving and negative rotation driving of the winding motor 55 in the third operation mode M3 (Steps S6 and S13). Steps other than these are similar to those in the first control example. Furthermore, in the third control example, a description of the load releasing operation (Steps S11 o S13 in FIG. 6 and FIG. 7) of releasing a tension (a load) on the wire-shaped member 54 is omitted.

In the third control example, a duty of a driving voltage to be supplied from the motor driving power source 73 to the winding motor 55 is set to 80% in the first operation mode M1, 90% in the second operation mode M2, and 60% in the third operation mode M3. Thus, magnitudes of driving torques used in the first operation mode M1, the second operation mode M2, and the third operation mode M3 are in the order M2>M1>M3.

A driving torque used in the first operation mode M1 is set to be larger than that in the third operation mode M3, and thus a driving torque at the start of the forward travel operation or the backward travel operation is always larger than a driving torque at the end of the forward travel operation or the backward travel operation, so that it is possible to avoid a trouble that the winding motor 55 is brought into a locked state. Furthermore, a driving torque used in the second operation mode M2 is set to be even larger than that in the first operation mode M1, and thus a time required for each of the forward travel operation and the backward travel operation can be reduced.

Also in the third control example, when the switching position at which switching between the operation modes is performed lies in the light beam emission area R shown in FIG. 8, there is a possibility of the occurrence of incomplete wiping by the cleaning members 53 at the switching position. As a solution to this, the times T1 and T2 are set so that the switching position does not overlap with the light beam emission area R shown in FIG. 8. Specifically, the time T1 is set to be shorter than a length of time required for the first cleaning holder 511 and the second cleaning holder 512 to reach the light beam emission area R, and thus the first operation mode M1 is switched to the second operation mode M2 before the first cleaning holder 511 and the second cleaning holder 512 reach the light beam emission area R. Furthermore, the time T2 is set to be longer than a length of time required for the first cleaning holder 511 and the second cleaning holder 512 to pass through the light beam emission area R, and thus the second operation mode M2 is switched to the third operation mode M3 after the first cleaning holder 511 and the second cleaning holder 512 have passed through the light beam emission area R.

Other than the above, the present disclosure is not limited to the foregoing embodiment and can be variously modified without departing from the spirit of the present disclosure. For example, while the description of the foregoing embodiment uses a tandem-type color printer as an example of the image forming apparatus 1, the present disclosure is not limited to a color printer and is applicable also to an electrophotographic color image forming apparatus such as a color copy machine or a color facsimile.

Furthermore, the present disclosure is not limited to a color image forming apparatus and is applicable also to an electrophotographic monochrome image forming apparatus such as a monochrome printer or a monochrome multifunctional peripheral. In a case of a monochrome image forming apparatus, a single photosensitive drum is provided, and thus the optical scanning device 12 has a single emission port for laser light emitted from the scanning optical system 120 to the photosensitive drum. Therefore, only a single transmissive member 52 is provided that seals the emission port.

Figure 10:
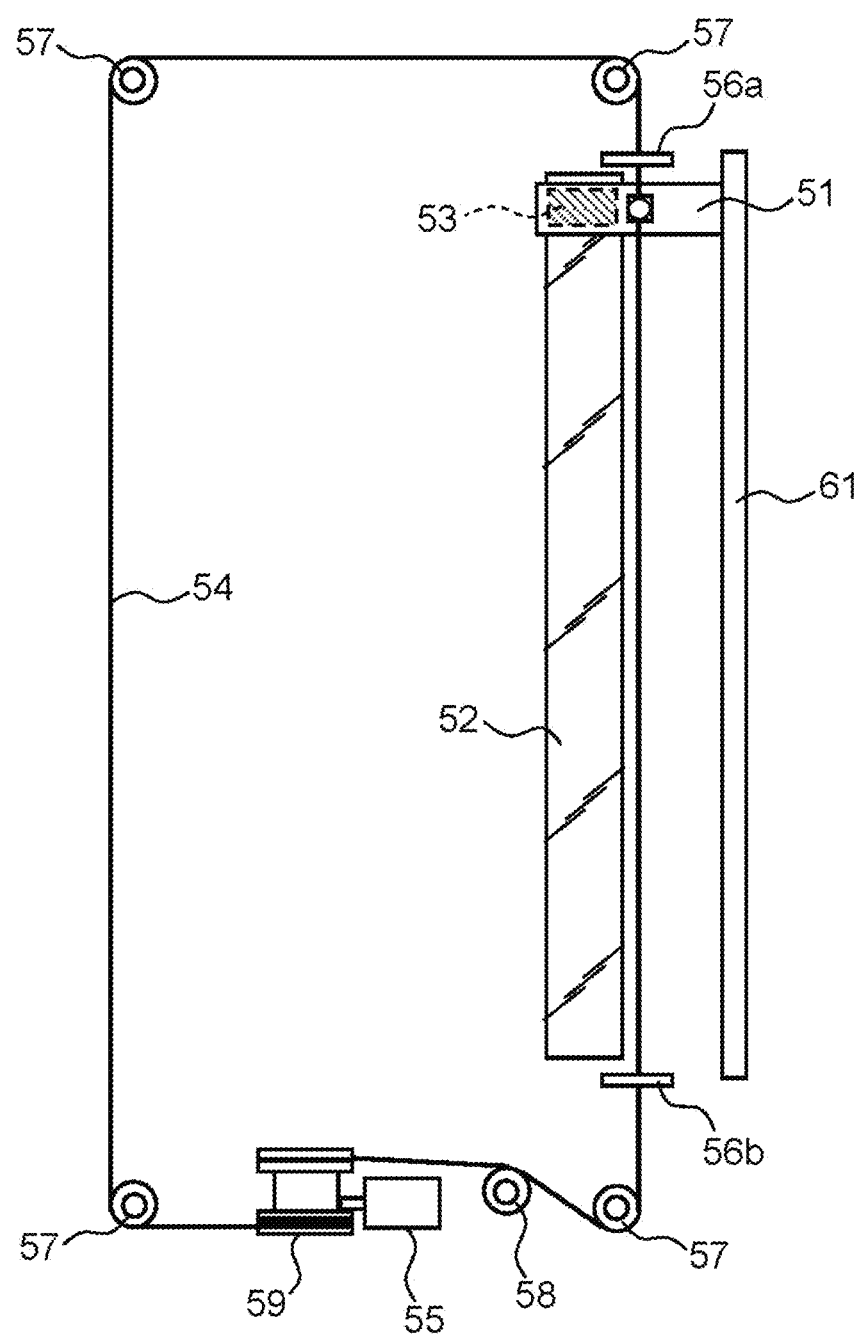
FIG. 10 is a plan view showing a movement mechanism of a cleaning holder in an optical scanning device used in a monochrome image forming apparatus.

FIG. 10 is a plan view showing a movement mechanism of a cleaning holder 51 in an optical scanning device 12 used in a monochrome image forming apparatus. As shown in FIG. 10, there is provided one cleaning holder 51 that reciprocates along a transmissive member 52, and a wire-shaped member 54 is fixed at a center of the cleaning holder 51 in a width direction thereof orthogonal to a movement direction of the cleaning holder 51. Further, a cleaning member 53 is held at a position on the cleaning holder 51 on one end side in the width direction thereof, which is opposed to the transmissive member 52, and a guide rail 61 is provided to extend on the other end side of the cleaning holder 51 in the width direction thereof. A first stopper 56a and a second stopper 56b are disposed at one end side (an upper end side) and the other end side (a lower end side) in the movement direction of the cleaning holder 51, respectively.

Also in a configuration shown in FIG. 10, a winding motor 55 is driven according to the above-described first and second control examples, and thus t is possible to avoid the state where a tension (a load) is kept applied on the wire-shaped member 54. In a case of the first control example, the cleaning holder 51 needs to be in contact with a stopper at the end of each of the forward travel operation and the backward travel operation, and thus it is required that the first stopper 56a and the second stopper 56b be disposed on both end sides in the movement direction of the cleaning holder 51.

Furthermore, the foregoing embodiment describes an example of executing the cleaning mode such that the forward travel operation in which the first cleaning holder 511 and the second cleaning holder 512 move along the transmissive members 52 and the subsequent backward travel operation in which the first cleaning holder 511 and the second cleaning holder 512 move in an opposite direction to a direction of the forward travel operation are performed as one cycle. The cleaning mode, however, may be constituted only of one forward travel operation or one backward travel operation. Also in that case, after the end of the forward travel operation or after the end of the backward travel operation, the load releasing operation is additionally performed, and thus it is possible to avoid the state where a tension (a load) is kept applied on the wire-shaped member 54.

Furthermore, the materials, shapes, and so on of the various constituent elements described in the foregoing embodiment are not particularly limited but illustrative and can be variously modified without substantially departing from the effect of the present disclosure. For example, while the foregoing embodiment uses the stretching pulleys 57 that stretch the wire-shaped member 54 in a loop, a configuration may also be adopted in which, instead of the stretching pulleys 57, a plurality of protrusions are provided on the outer surface of the cover portion 12c, and the wire-shaped member 54 is laid across the protrusions. Similarly, as the tension adjustment mechanism, instead of the tension adjustment pulley 58, at least one protrusion may be provided on the outer surface of the cover portion 12c. Furthermore, the tension adjustment mechanism and the winding drum 59 may be omitted.

The present disclosure is usable for an optical scanning device that irradiates an image carrier with light so as to form an electrostatic latent image. Through the use of the present disclosure, there can be provided an optical scanning device and an image forming apparatus including the same, the optical scanning device being capable of suppressing the occurrence of a stretch or a break in a wire-shaped member caused by a load continuously applied thereto during a non-operation time of a cleaning holder for cleaning a transmissive member that transmits laser light.

What is claimed is:

1. An optical scanning device that irradiates an image carrier with laser light so as to form an electrostatic latent image, comprising:
   a housing in which an emission port for the laser light is formed to extend in a main scanning direction of the laser light so as to correspond to the image carrier;
   a transmissive member that has a transmission property with respect to the laser light, extends in the main scanning direction of the laser light, and seals the emission port for the laser light;
   a wire-shaped member that is stretched in a loop on the housing;
   a driving portion that drives the wire-shaped member to travel in a first direction and a second direction;
   a cleaning holder that is fixed to the wire-shaped member and, when the wire-shaped member is driven to travel in a loop by the driving portion, moves in an extending direction of the transmissive member;
   a cleaning member that is fixed to the cleaning holder and, as the cleaning holder moves, slides with respect to the transmissive member, thus cleaning the transmissive member;
   a stopper that is disposed at an end of a movement route of the cleaning holder and restricts movement of the cleaning holder; and
   a control portion that controls driving of the driving portion,
   wherein
   the control portion is capable of executing a cleaning mode including at least one of:
      a forward travel operation of controlling the wire-shaped member to travel in the first direction so that the cleaning holder moves along the extending direction of the transmissive member; and
      a backward travel operation of, after executing the forward travel operation, controlling the wire-shaped member to travel in the second direction so that the cleaning holder moves in an opposite direction to a direction of the forward travel operation,
   after executing the cleaning mode, the control portion executes a load releasing operation of controlling the cleaning holder to move by a prescribed amount in an opposite direction to the direction of the forward travel operation or the backward travel operation as a final operation in the cleaning mode,
   each of the forward travel operation and the backward travel operation includes two or more operation modes using different driving torques of the driving portion from each other, and
   the load releasing operation includes one operation mode using a driving torque of the driving portion larger than that in a final operation mode set at an end of each of the forward travel operation and the backward travel operation.

2. The optical scanning device according to claim 1, wherein a duration of the operation mode in the load releasing operation is shorter than that of each of all the operation modes in the cleaning mode.

3. The optical scanning device according to claim 2, wherein at an end of the load releasing operation, the control portion controls the driving portion to be stopped at such timing that the cleaning holder lies outside a light beam emission area of the transmissive member.

4. The optical scanning device according to claim 1, wherein an initial operation mode set at a start of each of the forward travel operation and the backward travel operation uses a driving torque of the driving portion larger than that in the final operation mode.

5. The optical scanning device according to claim 1, wherein an initial operation mode set at a start of each of the forward travel operation and the backward travel operation has a duration shorter than that of the final operation mode.

6. The optical scanning device according to claim 1, wherein each of the forward travel operation and the backward travel operation is constituted of three modes that are an initial operation mode set at a start of each of the forward travel operation and the backward travel operation, an intermediate operation mode performed subsequent to the initial operation mode, and the final operation mode performed subsequent to the intermediate operation mode, and the intermediate operation mode uses a driving torque of the driving portion larger than that in the initial operation mode.

7. The optical scanning device according to claim 1, wherein
the control portion performs switching between the operation modes in each of the forward travel operation and the backward travel operation at such timing that the cleaning holder lies outside a light beam emission area of the transmissive member.

8. The optical scanning device according to claim 1, further comprising:
a driving voltage power source that supplies a driving voltage to the driving portion,
wherein the control portion controls a duty of the driving voltage to vary and thus adjusts a driving torque used in each of the operation modes in the cleaning mode and the operation mode in the load releasing operation.

9. The optical scanning device according to claim 1, further comprising:
a time measurement portion that measures a driving time of the driving portion,
wherein the control portion controls the driving portion to be stopped when the driving time after switching to the final operation mode is longer than a prescribed length of time.

10. The optical scanning device according to claim 1, further comprising:
a driving voltage power source that supplies a driving voltage to the driving portion: and
a detection portion that detects a current value or a voltage value of a current that flows when the driving voltage is supplied to the driving portion,
wherein when the current value or the voltage value detected by the detection portion is larger than a prescribed value, the control portion determines that the cleaning holder has come into contact with the stopper and thus controls the driving portion to be stopped at an end of the forward travel operation or the backward travel operation.

11. The optical scanning device according to claim 1, wherein
the housing is a housing in which a plurality of emission ports for laser light are juxtaposed to extend in the main scanning direction of the laser light so as to correspond to a plurality of the image carriers,
the transmissive member comprises a plurality of transmissive members that close the plurality of emission ports for the laser light, respectively,
the cleaning holder comprises a first cleaning holder and a second cleaning holder that move along extending directions of the plurality of transmissive members when the wire-shaped member is driven to travel in a loop by the driving portion,
the stopper comprises:
a first stopper that is disposed at an end on one side in the extending directions of the plurality of transmissive members and restricts movement of the first cleaning holder toward the one side; and
a second stopper that is disposed at an end on one side in the extending directions of the plurality of transmissive members and restricts movement of the second cleaning holder toward the one side,
in the forward travel operation, the first cleaning holder moves toward the one side and the second cleaning holder moves toward another side that is an opposite direction to the one side, and
in the backward travel operation, the first cleaning holder moves toward the other side and the second cleaning holder moves toward the one side.

12. An image forming apparatus, comprising:
the image carrier that comprises one or more image carriers; and
the optical scanning device according to claim 1, which irradiates each of the one or more image carriers with laser light so as to form an electrostatic latent image.

13. An optical scanning device that irradiates an image carrier with laser light so as to form an electrostatic latent image, comprising:
a housing in which an emission port for the laser light is formed to extend in a main scanning direction of the laser light so as to correspond to the image carrier;
a transmissive member that has a transmission property with respect to the laser light extends in the main scanning direction of the laser light, and seals the emission port for the laser light;
a wire-shaped member that is stretched in a loop on the housing;
a driving portion that drives the wire-shaped member to travel in a first direction and a second direction;
a cleaning holder that is fixed to the wire-shaped member and, when the wire-shaped member is driven to travel in a loop by the driving portion, moves in an extending direction of the transmissive member;
a cleaning member that is fixed to the cleaning holder and, as the cleaning holder moves, slides with respect to the transmissive member, thus cleaning the transmissive member;
a stopper that is disposed at an end of a movement route of the cleaning holder and restricts movement of the cleaning holder; and
a control portion that controls driving of the driving portion,
wherein
the control portion is capable of exec cleaning mode including at least one of:
a forward travel operation of controlling the wire-shaped member to travel in the first direction so that the cleaning holder moves along the extending direction of the transmissive member: and
a backward travel operation of, after executing the forward travel operation, controlling the wire-shaped member to travel in the second direction so that the cleaning holder moves in an opposite direction to a direction of the forward travel operation, and
after executing the cleaning mode, the control portion executes a load releasing operation of controlling the cleaning holder to move by a prescribed amount in an opposite direction to the direction of the forward travel operation or the backward travel operation as a final operation in the cleaning mode, each of the forward travel operation and the backward travel operation includes two or more operation modes using different driving torques of the driving portion from each other, and the load releasing operation includes one operation mode using a driving torque of the driving portion equal to that in a final operation mode set at an end of each of the forward travel operation and the backward travel operation.

\* \* \* \* \*